United States Patent
Chun

(10) Patent No.: US 10,597,325 B2
(45) Date of Patent: Mar. 24, 2020

(54) POSTPONED ONSET OF QUICKLIME HYDRATION

(71) Applicant: GCP Applied Technologies Inc., Cambridge, MA (US)

(72) Inventor: Byong-wa Chun, Waban, MA (US)

(*) Notice: Subject to any disclaimer, the term of this patent is extended or adjusted under 35 U.S.C. 154(b) by 85 days.

(21) Appl. No.: 15/776,519

(22) PCT Filed: Nov. 14, 2016

(86) PCT No.: PCT/US2016/061855
§ 371 (c)(1),
(2) Date: May 16, 2018

(87) PCT Pub. No.: WO2017/087326
PCT Pub. Date: May 26, 2017

(65) Prior Publication Data
US 2019/0010087 A1   Jan. 10, 2019

Related U.S. Application Data

(60) Provisional application No. 62/255,657, filed on Nov. 16, 2015.

(51) Int. Cl.
| C04B 2/10 | (2006.01) |
| C04B 22/06 | (2006.01) |
| C01F 11/02 | (2006.01) |
| C01F 5/02 | (2006.01) |
| C04B 28/02 | (2006.01) |
| C04B 28/04 | (2006.01) |
| C04B 111/00 | (2006.01) |

(52) U.S. Cl.
CPC ............... *C04B 2/104* (2013.01); *C01F 5/02* (2013.01); *C01F 11/02* (2013.01); *C04B 22/064* (2013.01); *C04B 28/02* (2013.01); *C04B 28/04* (2013.01); *C04B 2111/00146* (2013.01)

(58) Field of Classification Search
CPC ....... C04B 2/104; C04B 22/064; C04B 28/02; C04B 28/04; C04B 2111/00146; C01F 5/02; C01F 11/02
See application file for complete search history.

(56) References Cited

U.S. PATENT DOCUMENTS

| 2,334,499 A | 11/1943 | Millard |
| 2,489,793 A | 11/1949 | Ludwig |
| 2,725,313 A | 11/1955 | Smith et al. |
| 3,884,710 A | 5/1975 | Allen et al. |
| 4,316,583 A | 2/1982 | Kawano et al. |
| 4,354,877 A | 10/1982 | Kawano et al. |
| 4,409,030 A | 10/1983 | Minegishi et al. |
| 4,565,579 A | 1/1986 | Fujioka et al. |
| 4,717,503 A * | 1/1988 | Makino ............... C04B 28/10 252/183.13 |
| 6,565,647 B1 * | 5/2003 | Day ................. C04B 20/008 106/626 |
| 6,793,704 B2 | 9/2004 | You |
| 8,277,556 B2 | 10/2012 | Berke et al. |
| 8,444,764 B2 | 5/2013 | Winkler et al. |
| 2003/0126898 A1 | 7/2003 | You |
| 2013/0289169 A1 | 10/2013 | Hampel |
| 2015/0140341 A1 | 5/2015 | Robinson et al. |
| 2015/0315078 A1 | 11/2015 | Feldman et al. |

FOREIGN PATENT DOCUMENTS

| EP | 002900 | 5/1981 |
| EP | 0174599 | 3/1986 |
| JP | 1979090231 | 7/1979 |
| JP | 2002363964 | 12/2002 |
| JP | 2008069136 | 3/2008 |
| WO | 9425727 | 11/1994 |

OTHER PUBLICATIONS

Thomas, Form PCT/ISA/220, International Search Report for PCT/US2016/061855, dated Jan. 24, 2017, 3 pages.
Thomas, Form PCT/ISA/237, Written Opinion of the International Searching Authority for PCT/US2016/061855, dated Jan. 24, 2017, 7 pages.

* cited by examiner

*Primary Examiner* — Anthony J Green
(74) *Attorney, Agent, or Firm* — Craig K. Leon; Nilay J. Choksi

(57) ABSTRACT

The present invention provides compositions and methods relative to controlling hydration onset of an alkaline earth metal oxide such as calcium oxide, comprising heating an inorganic alkaline earth metal oxide to sub-calcination temperatures in the presence of organic material comprising a carbohydrate, an amino-carboxylic acid, a hydroxycarboxylic acid, or a mixture thereof. Preferred treated particles comprise at least 40% and more preferably at least 80% by dry weight calcium oxide which is heated in the presence of ascorbic acid and a starch. Treated particles of the present invention manifest an unexpected, surprising hydration induction postponement behavior as demonstrated through calorimetric testing.

18 Claims, 4 Drawing Sheets

POSTPONED ONSET OF QUICKLIME HYDRATION

FIELD OF THE INVENTION

This invention relates to the treatment of alkaline earth metal oxide materials, and, more particularly, to treated oxide particles made by heating precursor alkaline earth metal oxide, such as calcium oxide, at a specific temperature range below calcination temperature in the presence of organic material comprising a carbohydrate, amino-carboxylic acid, hydroxycarboxylic acid, or mixture thereof.

BACKGROUND OF THE INVENTION

Calcium oxide or "quicklime" is a known expansive agent and heat-release agent used in cements and concretes. The hydration reaction of calcium oxide is rapid, highly exothermic, difficult to control, such that its applications are limited due to a drastic and intense hydration profile. The hydration reaction of calcium oxide can be considerably attenuated by calcination processing, e.g., U.S. Pat. No. 4,354,877 of Kawano et al., whereby burning of the calcium oxide is done at very high temperatures around 1400° C. The manufacturing of hard-burned quicklime is difficult; and few products appear to be commercially available.

In U.S. Pat. No. 4,565,579, Fujioka et al. taught combining calcium fluoride with calcium oxide and hydration retarding agents, and heating this composition to a temperature of from about 800° C.-1400° C. This chemical composition is intended for "gently" breaking rocks or concrete masses apart.

While one might find calcium oxide listed as an expansive agent for use in concrete and other cementitious materials, it is not surprising to find other expansion agents, such as magnesium oxide or calcium sulfoaluminate, as more preferred due to their less intensive hydration profiles. See e.g., U.S. Pat. No. 8,277,556 of Neal S. Berke et al. (owned by the common assignee hereof), at column 11, lines 56-59.

With regard to cement compositions containing quicklime, it is known to use common retarders (e.g., derivatives of carboxylic acid, hydroxyl acid, ketocarboxylic acid, sugars, sugar alcohol) for postponing the hydration reaction (coagulation and hardening) of the cement to a time that is subsequent to the hydration reaction of the quicklime, See e.g., Japanese Publication No. 200236364. However, as will be demonstrated by the present inventor hereinafter, the use of conventional retarders attenuates the overall exothermic profile of calcium oxide hydration, without achieving control over onset of hydration (e.g., reaction initiation).

The present inventor believes that a novel composition and method for controlling the hydration induction of calcium oxide is needed.

SUMMARY OF THE INVENTION

The present invention relates to controlling the hydration of alkaline earth metal oxide, and particularly calcium oxide in preferred embodiments, to postpone onset of hydration of the treated oxide particles when mixed with water. The approach described herein is especially suitable for calcium oxide, as well as mixtures of calcium oxide and magnesium oxide where a combined less intense hydration reaction is desired. Preferred embodiments of the invention comprise particles having at least 40% of calcium oxide based on total dry weight, and more preferably at least 80%, and even up to 100% by weight of calcium oxide (the percentage weight being based on the inorganic portion of the particles).

An exemplary composition of the present invention comprises: treated alkaline earth metal oxide particles made by heating precursor alkaline earth metal oxide particles comprising calcium oxide, magnesium oxide, or mixture thereof, in an amount of 40%-100% based on total dry weight of the inorganic portion of the particles, at an average temperature within 200° C.-700° C. (and more preferably 250° C.-500° C.), for a period of 15-300 minutes (and more preferably 20-200 minutes) in the presence of organic material comprising a carbohydrate, amino-carboxylic acid, hydroxycarboxylic acid, or a mixture thereof. Most preferred is the use of precursor particles having at least 50% and up to 80% or more of calcium oxide (based on total dry weight of inorganic portion of particles). The present invention also provides a method for treating alkaline earth metal oxide particles comprising the heating treatment described above.

The present invention also provides cementitious compositions containing cement binder and the above-described treated alkaline earth metal oxide particles as well as methods for modifying or placing the cementitious compositions by incorporating the above-described treated alkaline earth metal oxide particles.

Thus, an exemplary method comprises mixing the above-described treated alkaline earth metal oxide particles in dry powder form into Ordinary Portland Cement (also preferably in the form of dry powder). When mixed with water in amount sufficient to hydrate both the cement and oxide particles, this hydraulic cementitious mixture can be poured, pumped (e.g., through long hoses), or sprayed into place and allowed to harden in place. Controlled onset of hydration in the treated alkaline earth metal oxide particles provides flexibility of operation for application of the cementitious composition.

Further advantages and benefits of the invention are described in further detail hereinafter.

BRIEF DESCRIPTION OF DRAWINGS

An appreciation of the benefits and features of the invention may be more readily comprehended through consideration of the written description of preferred embodiments in conjunction with the drawings, wherein.

DETAILED DESCRIPTION OF PREFERRED EMBODIMENTS

Figure 1:
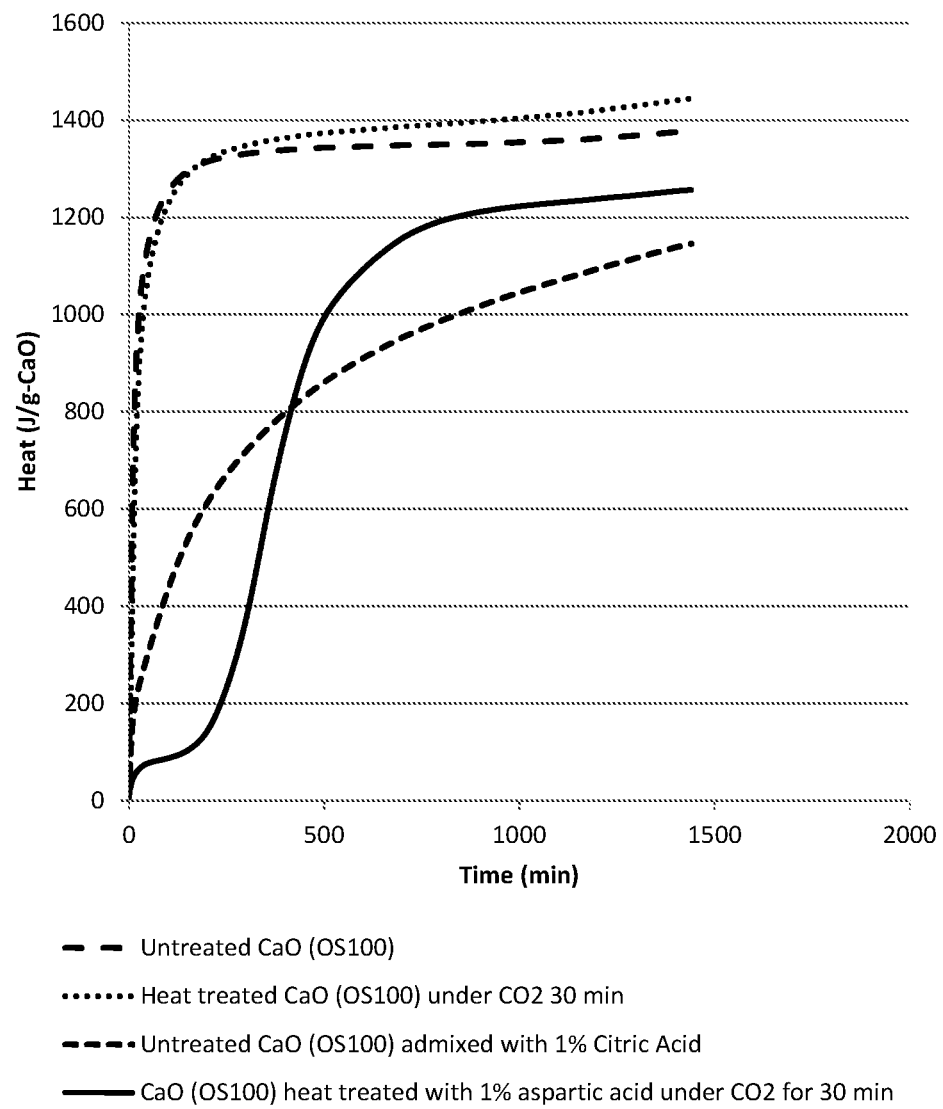
FIG. 1 is a graphic illustration of calorimetric behavior (J/g, cumulative heat) of various samples of hydration of alkaline earth metal oxide (e.g., calcium oxide) over time, wherein it is shown that only the calcium oxide treated in accordance with teachings of the present invention (e.g., heating in specific sub-calcination range in the presence of aspartic acid) demonstrates an appreciable delay in the initiation or onset of hydration (e.g., after the calcium oxide is mixed with water in amount sufficient to hydrate the calcium oxide) over the initial 250 minutes at 21° C. just after mixing with water.

The present invention relates to methods and compositions for treating alkaline earth metal oxide particles. The treated particles are particularly useful for modifying cement, masonry, mortar, shotcrete, concrete, and other hydratable cementitious compositions, optionally with chemical admixtures such as plasticizers or superplasticizers.

The present invention also relates to hydratable cementitious compositions comprising the treated alkaline earth metal oxide particles (e.g., at least 40%-100% calcium oxide, magnesium oxide, or combination thereof in an amount based on total dry weight of inorganic portion of the particles; and, more preferably, at least 50% by total dry weight calcium oxide based on inorganic portion of the particles), a cement binder, aggregates, and optionally including shrink reducing agent (SRA), and cement dispersants such as plasticizers or superplasticizers.

The term "quicklime" is used herein to refer to calcium oxide (CaO) which is most preferred of the alkaline earth metal oxide particles treated in accordance with the present invention.

One of the most notable features of treated alkaline earth metal oxide particle compositions of the present invention is the unique delayed onset of hydration (postponement of the so-called "induction period"), which is unlike the behavior of conventional retarding agents as typically used for oxides or cements.

In addition, the present invention enables one to control the induction period by simply adjusting either the amount of the organic materials used during heating of precursor (pretreated) alkaline earth metal oxide particles, the heat treatment time, or both.

The term "cement" as used herein includes hydratable cement and Portland cement which is produced by pulverizing clinker consisting of hydraulic calcium silicates and one or more forms of calcium sulfate (e.g., gypsum) as an interground additive. Typically, Portland cement is combined with one or more supplemental cementitious materials, such as Portland cement, fly ash, granulated blast furnace slag, limestone, natural pozzolans, or mixtures thereof, and provided as a blend. The term "cementitious" refers to materials that comprise Portland cement or which otherwise function as a binder to hold together fine aggregates (e.g., sand), coarse aggregates (e.g., crushed stone, rock, gravel), or mixtures thereof.

The term "hydratable" is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO.SiO_2$ "$C_3S$" in cement chemists notation) and dicalcium silicate ($2CaO.SiO_2$, "$C_2S$") in which the former is the dominant form, with lesser amounts of tricalcium aluminate ($3CaO.Al_2O_3$, "$C_3A$") and tetracalcium aluminoferrite ($4CaO.Al_2O_3.Fe_2O_3$, "$C_4AF$"). See e.g., Dodson, Vance H., *Concrete Admixtures* (Van Nostrand Reinhold, New York N.Y. 1990), page 1.

The term "concrete" will be used herein generally to refer to a hydratable cementitious mixture comprising water, cement, sand, usually a coarse aggregate such as crushed stone, rock, or gravel, and optional chemical admixture(s).

An exemplary composition of the present invention comprises treated alkaline earth metal oxide particles treated by heating precursor particles comprising 40-100 percent by total dry weight of calcium oxide, magnesium oxide, or mixture thereof (based on total dry weight of inorganic portion of the particles), at an average temperature within 200° C.-700° C. for a period of 20-300 minutes, in the presence of organic material comprising a carbohydrate, an amino-carboxylic acid, a hydroxycarboxylic acid, or mixture thereof.

In a preferred embodiment, the treated alkaline earth metal oxide particles comprise at least 50 percent by total dry weight of calcium oxide (CaO), and more preferably at least 80, and most preferably at least 90% and up to 100% based on total dry weight inorganic portion of the particles. The particles are most preferably heated in the range of 250° C.-500° C. Preferred particles of the present invention have a delayed or postponed onset of hydration of at least 30 minutes after the particles are mixed with water (in an amount sufficient to initiate hydration); and, more preferably, they have a postponed hydration onset (or induction) of at least 60 minutes after mixing with hydration water.

When the precursor particles are heated in the presence of a carbohydrate, the preferred carbohydrate is a starch. It is also preferred that the starch is a pregelatinized, refined starch selected from corn, tapioca, wheat, rice, potato, sweet potato, sago, and bean starches (such as mung bean). It is possible for other vegetable or plant sources may be used for obtaining the starch.

When the precursor particles are heated in the presence of an amino-carboxylic acid, it is preferred that the amino-carboxylic acid be selected from the group consisting of aspartic acid, glutamic acid, glycine, alanine, phenylalanine, methionine, serine, and threonine. Preferred is aspartic acid, and most preferred is aspartic acid in combination with a pre-gelatinized, refined starch. In other exemplary embodiments, the aspartic acid may be comprised of at least 80 percent based on total weight of aspartic acid of L-aspartic acid, although the present inventors believes that both D-aspartic acid and L-aspartic acid forms can be used individually or in combination with satisfactory results.

When the precursor particles are heated in the presence of a hydroxycarboxylic acid, the preferred hydroxycarboxylic acid is citric acid.

The total amount of the one or more organic material(s) to be heated with the alkaline earth metal oxide particles, whether carbohydrate, amino-carboxylic acid, hydroxycarboxylic acid, or mixture thereof, can be in the range of 0.5%-20% by dry weight based on total dry weight of the alkaline earth metal oxide particles to be treated.

The present invention also provides cementitious compositions comprising a hydratable cementitious binder (e.g., Ordinary Portland Cement, a pozzolan, or mixture thereof, as previously described above in this detailed section) in combination with the treated alkaline earth metal oxide particles as described herein. For example, the cementitious composition may further optionally include an aggregate and at least one chemical admixture, such as a shrink reducing agent (SRA), a plasticizer or superplasticizing admixture for allowing the cement, mortar, or concrete composition to be pumped through a hose and/or nozzle, so that, for example, it can be placed several floors above ground level, or, as another example, so that it can be spray-applied in the manner of shotcrete as a tunnel lining or other construction material layer.

The present invention further provides a method for modifying a cementitious composition comprising: mixing together a hydratable cementitious binder, optional aggregate and/or chemical admixture, and the treated alkaline earth metal oxide particles as described hereinabove. In further exemplary embodiments, the treated alkaline earth metal oxide particles are mixed as a dry powder into the cementitious binder which is also a dry powder, or, alternatively, the treated alkaline earth metal oxide particles can be mixed into a wet cementitious paste or slurry. Alternatively, the treated alkaline earth metal oxide particles can be mixed into a cementitious slurry comprising the cementitious binder which is mixed with water, and this can be optionally used with aggregate and a chemical plasticizing admixture and pumped through a hose to a location where the cementitious composition is poured or sprayed into place and allowed to harden into place.

An exemplary method of the present invention for treating alkaline earth metal oxide comprises: heating precursor particles comprising at least 40-100 percent by total dry weight of calcium oxide, magnesium oxide, or mixture thereof, at an average temperature within 200° C.-700° C. for a period of 20-300 minutes, in the presence of organic material comprising a carbohydrate, an amino-carboxylic acid, a hydroxycarboxylic acid, or a mixture thereof. In a preferred embodiment, the treated particles contain calcium oxide, magnesium oxide, or mixture thereof in amount of 70%-100% by total dry weight of the inorganic portion of the particles.

It is contemplated that one or more chemical admixtures for modifying concrete or mortar may be used in the methods and compositions of the present invention for modifying cementitious materials with which the treated alkaline earth metal oxide particles are combined. These chemical admixtures may include, without limitation, a shrinkage reducing admixture (such as commercially available under the trademarks Eclipse® and Tetraguard®, for example, as well as other glycol based SRA products), water reducing admixtures (such as lignin sulfonate, naphthalene sulfonate formaldehyde condensate (NSFC), melamine sulfonate formaldehyde condensate (MSFC), polycarboxylate comb polymers (containing alkylene oxide groups such as "EO" and/or "PO" groups), gluconate, and the like); set retarding admixtures; set accelerating admixtures; air entraining agents; air detraining agents (defoamers); surface active agents; and combinations of any of the foregoing.

Of the conventional concrete or mortar admixtures, the EO-PO type polymers, which have ethylene oxide ("EO") and/or propylene oxide ("PO") groups and polycarboxylate groups, are preferred. Cement dispersants contemplated for use in methods and compositions of the invention include EO-PO polymers and EO-PO comb polymers, as described for example in U.S. Pat. Nos. 6,352,952 B1 and 6,670,415 B2 of Jardine et al., which mentioned the polymers taught in U.S. Pat. No. 5,393,343 (GCP Applied Technologies, Inc.). These polymers are available from GCP Applied Technologies Inc., 62 Whittemore Avenue, Cambridge, Mass., USA, under the federally registered trade mark ADVA®. Another exemplary cement dispersant polymer, also containing EO/PO groups, is obtained by polymerization of maleic anhydride and an ethylenically-polymerizable polyalkylene, as taught in U.S. Pat. No. 4,471,100. In addition, EO/PO-group-containing cement dispersant polymers are taught in U.S. Pat. Nos. 5,661,206 and 6,569,234. The amount of such polycarboxylate cement dispersants used within concrete may be in accordance with conventional use (e.g., 0.05% to 0.25% based on weight of active polymer to weight of cementitious material).

Exemplary compositions of the present invention may comprise, in addition to the treated alkaline earth metal oxide particles and cementitious binder, at least one chemical admixture selected from the group of shrinkage reducing agent (SRA), water reducing agents (e.g., lignin sulfonate, naphthalene sulfonate formaldehyde condensate (NSFC), melamine sulfonate formaldehyde condensate (MSFC), polycarboxylate comb polymers (containing alkylene oxide groups such as "EO" and/or "PO" groups), gluconate, and the like); set retarders; set accelerators; defoamers; air entraining agents; surface active agents; and mixtures thereof.

While the disclosure is described herein using a limited number of embodiments, these specific embodiments are not intended to limit the scope of the disclosure as otherwise described and claimed herein. The following example is given as a specific illustration of embodiments of the claimed disclosure. It should be understood that the invention is not limited to the specific details set forth in the example.

Example 1

Treatment of Calcium Oxide Using Aspartic Acid. 200 grams of calcium oxide (quicklime) (available commercially under the brand name petroCal® OS100, Mississippi Lime Co., St. Louis, Mo.) was placed in 500-mL separable flask equipped with a mechanical stirrer with stainless steel puddle, gas inlet, gas outlet with bubbler, and a mantle heating with temperature control. Mantle heating temperature was controlled with thermocouple placed between mantle heating and the flask. Two grams of DL-aspartic acid (commercially available from Sigma-Aldrich Co., St. Louis, Mo.) was added to the flask containing the quicklime. The quicklime powder mixture was mechanically mixed under slow $CO_2$ gas flow. $CO_2$ gas was bubbled in water before introduction into the flask. Mantle heating temperature was controlled at 270° C. The powder mixture was mixed and heated for approximately 30 minutes. After 25 to 30 minutes of heating, exothermic behavior was observed. The actual temperature of the powder in the flask was higher than the set temperature of 270° C., believed to be in the range of 300-350° C. The whitish powder became slightly pinkish after reaction. After it was allowed to cool down, the powder was transferred to a container and subjected to hydration study.

Hydration Measurement of Treated Calcium Oxide. The obtained treated quicklime particles were subjected to calorimetric study whereby its hydration behavior could be analyzed overtime. A calorimeter, a CALMETRIX I-Cal 8000™ device, was used for this analysis. 2 grams of samples were mixed with 1 mL of lime saturated water. The slurry was mixed quickly and placed in the calorimeter at a temperature of 21° C. For comparison, a quicklime composition (designated "OS100") that is not treated according to the present invention, a quicklime combined with a retarder (citric acid) but not heat treated according to the present invention, and a quicklime that was heated (only) with wet carbon dioxide gas but not otherwise treated according to the full teachings of the invention were also measured.

As shown in FIG. 1, the foregoing calorimetric results are plotted as a function of exothermic behavior over time. The quicklime treated in accordance with the teachings of the present invention clearly shows a distinctive postponed hydration induction (in other words, the initiation of exothermic activity was postponed as shown by the entire bottom portion of the temperature curve moved conspicuously to the rightward direction of the graph). On the other hand, the use of citric acid which was merely added but not using heat treatment, did not postpone initiation of hydration but merely slowed hydration.

Example 2

Treatment of Calcium Oxide Using Starch. 200 grams of quicklime (PetroCal® OS100, Mississippi Lime Co., St.

Louis, Mo.) was mixed with 8 grams of starch (Ultra-Sperse®, National Starch Food Innovation, Bridgewater, N.J.) and 1.5 grams of precipitated silica flowing agent (W. R. Grace & Co., Columbia, Md.). The powder was placed in a 500-mL separable flask equipped with a mechanical stirrer with stainless steel puddle, thermocouple, and a mantle heating with temperature control. Mantle heating temperature was controlled with the thermocouple placed in the flask, so that the powder temperature was directly measured. The powder mixture was mechanically mixed. The temperature was set at 310° C. After approximately 30 minutes, exothermic behavior was observed. Inside the flask, the temperature was sharply increased to 340° C. The temperature decreased slowly downwards to 310° C. Heating was stopped 30 minutes after the peak heat time. 205.6 grams of lightly brownish powder were recovered from the flask and subjected to hydration measurement by isothermal calorimetry.

Figure 2:
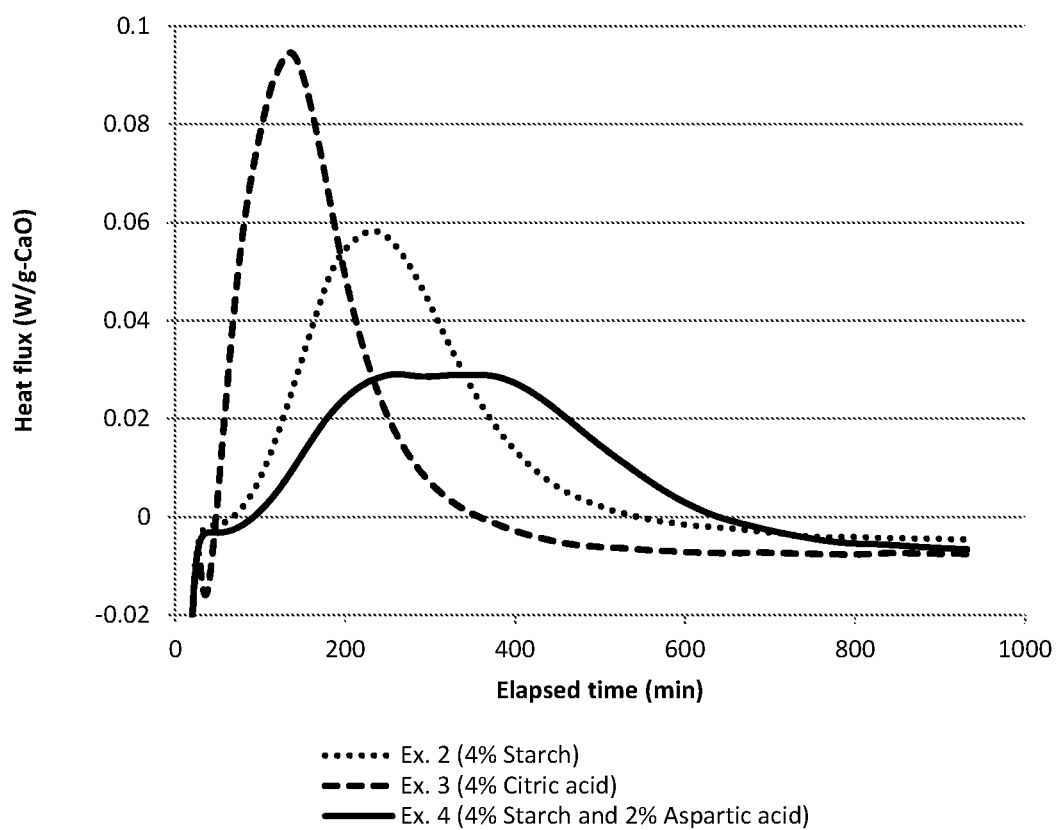
FIG. 2 is a graphic illustration of calorimetric behavior (W/g, hydration heat flux) of calcium oxide of Examples 2-4 over time at 45° C.

The isothermal calorimetry was performed at 45° C. to expedite the test. Two grams of the obtained treated powder were thoroughly mixed with 1 mL of saturated lime water containing $K_2SO_4$ (1.2%) and quickly transferred to an isothermal calorimeter and the measurement was started. FIG. 2 indicates that the hydration heat flux peak of the material of Example 2 is delayed by at least 200 minutes after the treated powder was mixed with water at 45° C.

Example 3

Treatment of Calcium Oxide Using Citric Acid. 200 grams of quicklime (PetroCal® OS100, Mississippi Lime Co., St. Louis, Mo.) was mixed with 8 grams of anhydrous citric acid (commercially available from Jungbunzlauer Inc., Newton, Mass., USA) and 1.4 grams of precipitated silica flowing agent (W. R. Grace & Co., Columbia, Md., USA). The treatment was performed as described in Example 2. After approximately 17 minutes, the temperature reached 230° C. and exothermic behavior was observed. Within 10 minutes, the temperature reached 330° C. The temperature slowly came down, and heating was stopped 15 minutes after peak temperature had been attained. The mixing was stopped 35 minutes after heating was stopped. 207 grams of slightly discolored powder were recovered from the flask and subjected to hydration measurement by isothermal calorimetry.

The isothermal calorimetry was performed at 45° C. to expedite the test. Two grams of the obtained treated powder were thoroughly mixed with 1 mL of saturated lime water containing $K_2SO_4$ (1.2%) and quickly transferred to isothermal calorimeter, and measurement was started. FIG. 2 indicates that the hydration heat flux peak of the material of Example 3 is delayed by at least 160 minutes or more after the treated powder was mixed with water at 45° C.

In this example, it is also notable that when citric acid is admixed with quicklime, the citric acid works as simple retarder in that it slows down the hydration reaction (FIG. 1); but, when used in combination with the controlled heat treatment in accordance with the present invention, the citric acid provided a distinct delay in the onset of hydration, and this was quite surprising and unexpected.

Example 4

Treatment of Calcium Oxide (quicklime) Using Aspartic Acid and Starch. 201 grams of quicklime (commercially available as PetroCal® OS100) were mixed with 8.1 grams of starch (commercially available as Ultra-Sperse®, National Starch Food Innovation, Bridgewater, N.J.), 4.0 grams of L-aspartic acid (Ajinomoto North America, Raleigh, N.C.) and 1.1 grams of precipitated silica flowing agent (commercially available from W.R. Grace & Co., 7500 Grace Drive, Columbia, Md., USA).

The heat treatment was performed as described in Example 2. After approximately 21 minutes, the temperature reached to 225° C. and exothermic behavior was observed. Within 10 minutes, temperature reached 340° C. The temperature slowly came down and heating was stopped after 20 min from the temperature peak time. Mixing continued for another 22 minutes. 209 grams of slightly brownish powder were recovered from the flask and subjected to hydration measurement by isothermal calorimetry (e.g., using a large heat sink to insulate the testing from temperature fluctuations or effects due to changes in room ventilation or heating, closing doors, passersby, etc.).

The isothermal calorimetry was performed at 45° C. to expedite the test. Two grams of the obtained treated powder were thoroughly mixed with 1 mL of saturated lime water containing $K_2SO_4$ (1.2%) and quickly transferred to isothermal calorimeter, and the measurement was started. FIG. 2 indicates that the hydration heat flux peak of the material of Example 4 is further delayed by about 200 min at 45° C.

Example 5

Treatment of Calcium Oxide Using Aspartic Acid. 350 grams of calcium oxide (quicklime) (available commercially under the brand name PetroCal® OS100, Mississippi Lime Co., St. Louis, Mo.) was placed in 500-mL separable flask equipped with a mechanical stirrer with stainless steel puddle, gas inlet, gas outlet with bubbler, and a mantle heating with temperature control. Mantle heating temperature was controlled with thermocouple placed between mantle heating and the flask. Seven grams of DL-aspartic acid (commercially available from Sigma-Aldrich Co., St. Louis, Mo.) and 3.5 grams of precipitated silica flowing agent (commercially available from W.R. Grace & Co., 7500 Grace Drive, Columbia, Md., USA) was added to the flask containing the quicklime. The quicklime powder mixture was mechanically mixed at 800 rpm. Mantle heating temperature was controlled at 340° C. Heating continued for 2 hours. Rapid exothermic behavior was observed during the period as mentioned in the earlier examples. Agitation was continued for another 30 minutes. The temperature came down to about 200-250° C. Then the flask was taken out from the mantle heating and further cooled down for another 20 minutes. The temperature of the powder further came down to about 50° C. The whitish powder became slightly pinkish after reaction. The powder was transferred to a container and subjected to hydration and cement mortar shrinkage study.

Figure 3:
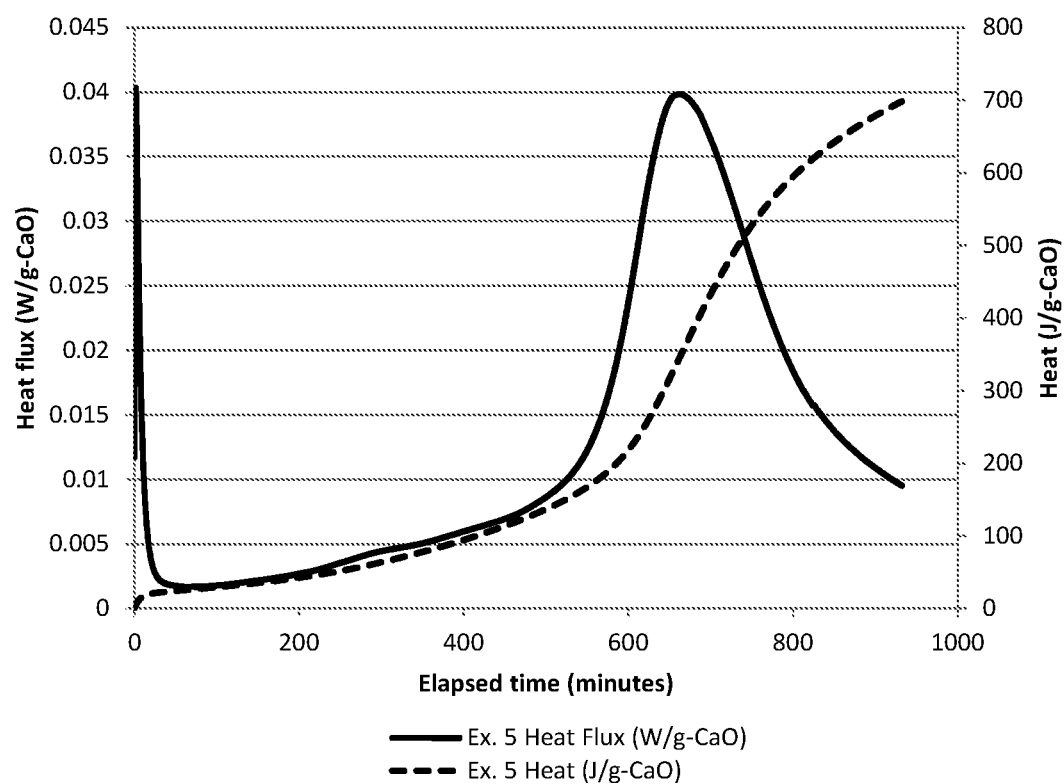
FIG. 3 is a graphic illustration of calorimetric behavior (W/g, hydration heat flux and J/g, hydration cumulative heat) of calcium oxide of Examples 5 over time at 21° C.
Figure 4:
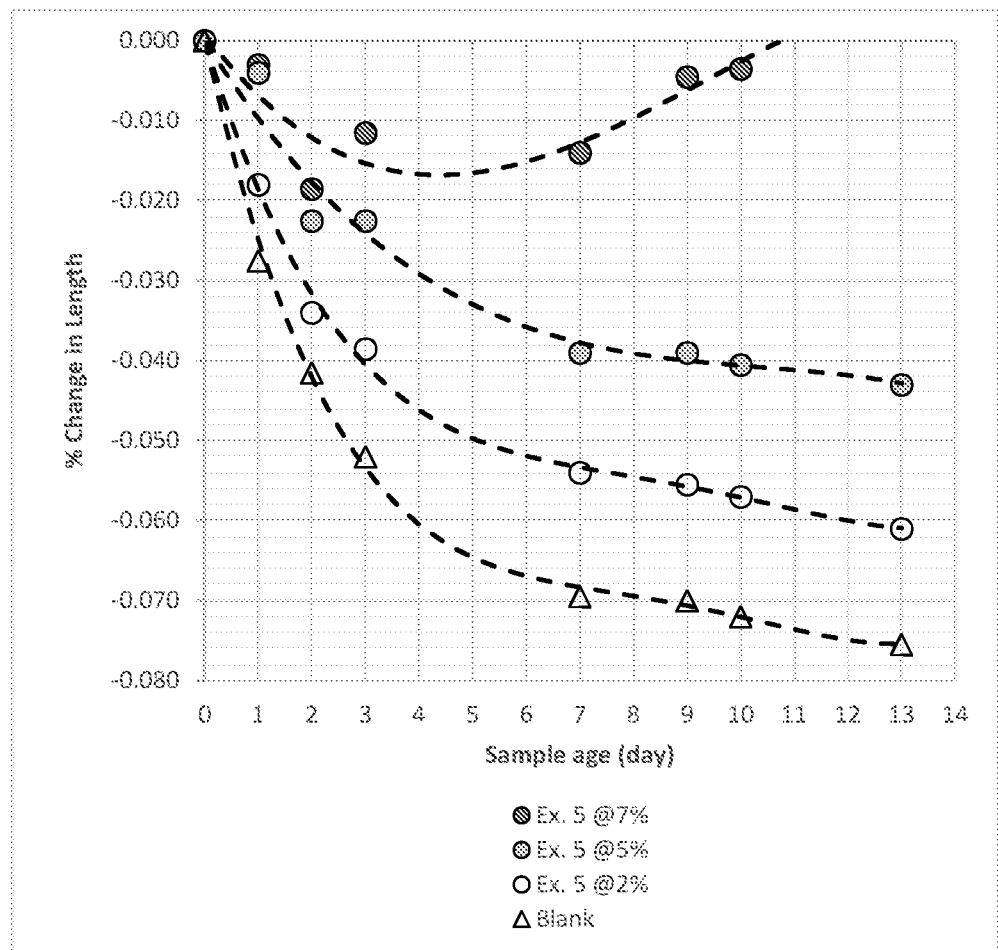
FIG. 4 is a graphic illustration of shrinkage and expansion behavior of cement mortar containing the calcium oxide of Example 5 at varied amount, weight % of the cement.

The isothermal calorimetry was performed at 21° C. Two grams of the obtained treated powder were thoroughly mixed with 1 mL of saturated lime water containing $K_2SO_4$ (1.2%) and quickly transferred to isothermal calorimeter, and the measurement was started. FIG. 3 indicates that the hydration heat of the material of Example 5 is delayed by 500-600 min Shrinkage Measurement of Cement Mortar with Treated Calcium Oxide. The obtained treated quicklime was served for mortar shrinkage test. Cement mortar was prepared by mixing a bagged standard EN-sand (1350 grams), Type-I/II Ordinary Portland cement (533 grams) and water (240 grams) with polycarboxylate high-range water reducer, HRWR, (0.06 wt. % active polymer on cement weight). Five weight % of the treated quicklime (26.65 grams) was added to cement. The "4-3-2 minutes" mixing—4 minutes mixing, 3 minutes rest and additional 2 minutes mixing—was employed to prepare the mortar. The HRWR was added to the mixing water. Shrinkage test was performed in accordance with ASTM C157/C157M-08, except that the mortar specimens were not subject to the 28-day curing procedure. The specimens were soaked in lime saturated water only for the initial 30 min after they were demolded at 24 hours. The specimens were stored under ambient laboratory condition (air storage) for 13 days for shrinkage measurement. Length change of the specimens was calculated according to ASTM C157/157M. FIG. 4 indicates that the addition of the material of Example 5 reduces the shrinkage of the cement mortar.

The principles, preferred embodiments, and modes of operation of the present invention have been described in the foregoing specification. The invention which is intended to be protected herein, however, is not to be construed as limited to the particular forms disclosed, as these are to be regarded as illustrative rather than restrictive. Skilled artisans can make variations and changes based on the foregoing specification without departing from the spirit of the invention.

It is claimed:

1. A composition comprising: treated alkaline earth metal oxide particles treated by heating precursor alkaline earth metal oxide particles comprising 40-100 percent by total dry weight of calcium oxide, magnesium oxide, or mixture thereof, at an average temperature within 200° C.-700° C., for a period of 20-300 minutes, in the presence of an organic material comprising (i) a starch, (ii) an amino-carboxylic acid selected from the group consisting of aspartic acid, glutamic acid, glycine, alanine, phenylalanine, methionine, serine, and threonine, or (iii) a mixture of (i) and (ii).

2. The composition of claim 1 wherein the treated alkaline earth metal oxide particles comprise at least 50 percent by total dry weight of calcium oxide based on total dry weight of the treated particles; and the treated particles are treated by heating to 250° C.-500° C. for 20-200 minutes.

3. The composition of claim 1 wherein the treated alkaline earth metal oxide particles comprise at least 80-100 percent by total dry weight of calcium oxide based on total dry weight of the treated particles; and the treated particles are treated by heating to 250° C.-500° C. for 20-200 minutes.

4. The composition of claim 1 wherein the treated precursor particles are heated in the presence of starch.

5. The composition of claim 1 wherein the treated precursor particles are heated in the presence of amino-carboxylic acid.

6. The composition of claim 5 wherein the precursor particles are heated in the presence of aspartic acid.

7. The composition of claim 6 wherein at least 80 percent by weight of the aspartic acid is L-aspartic acid.

8. The composition of claim 1 wherein the precursor particles are heated in the additional presence of a hydroxy-carboxylic acid.

9. The composition of claim 8 wherein the hydroxycarboxylic acid is citric acid.

10. The composition of claim 1 wherein the precursor particles are heated in the presence of aspartic acid and starch.

11. The composition of claim 1 wherein the starch is a pregelatinized starch selected from a refined starch obtained from corn, tapioca, wheat, rice, potato, sweet potato, sago, beans, and mixtures thereof.

12. The composition of claim 1 further comprising a hydratable cementitious binder.

13. The composition of claim 12 further comprising an aggregate.

14. The composition of claim 13 wherein the composition, when mixed with water, forms a paste or slurry of cementitious mortar, concrete, or shotcrete.

15. A method for modifying a cementitious composition comprising: mixing together a cementitious binder and composition according to claim 1.

16. The method of claim 15 wherein the cementitious binder and the composition are mixed together as dry powder.

17. The method of claim 16 wherein the dry powder is mixed into a cementitious slurry and then pumped through a hose to a location where the cementitious slurry is placed and hardened.

18. A composition comprising: treated alkaline earth metal oxide particles treated by heating precursor alkaline earth metal oxide particles comprising calcium oxide, magnesium oxide, or mixture thereof in the amount of 70-100 percent by dry weight based on the total inorganic portion of the particles, at an average temperature within 250° C.-500° C., for a period of 20-200 minutes, in the presence of an organic material comprising aspartic acid and a starch.

* * * * *